(12) United States Patent
Park et al.

(10) Patent No.: US 11,416,683 B2
(45) Date of Patent: Aug. 16, 2022

(54) NATURAL LANGUAGE GENERATING APPARATUS, VEHICLE HAVING THE SAME AND NATURAL LANGUAGE GENERATING METHOD

(71) Applicants: Hyundai Motor Company, Seoul (KR); Kia Motors Corporation, Seoul (KR)

(72) Inventors: Youngmin Park, Gunpo-si (KR); Seona Kim, Seoul (KR); Jeong-Eom Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

(21) Appl. No.: 16/665,757

(22) Filed: Oct. 28, 2019

(65) Prior Publication Data

US 2020/0342060 A1    Oct. 29, 2020

(30) Foreign Application Priority Data

Apr. 23, 2019   (KR) .................. 10-2019-0047133

(51) Int. Cl.
*G06F 40/30*     (2020.01)
*G06N 3/04*     (2006.01)
*G06N 3/08*     (2006.01)
*G06F 40/211*    (2020.01)

(52) U.S. Cl.
CPC ............ *G06F 40/30* (2020.01); *G06F 40/211* (2020.01); *G06N 3/04* (2013.01); *G06N 3/08* (2013.01)

(58) Field of Classification Search
CPC ..... G06F 17/2785; G06F 17/271; G06N 3/04; G06N 3/08
See application file for complete search history.

(56) References Cited

U.S. PATENT DOCUMENTS

| | | | | |
|---|---|---|---|---|
| 10,229,111 | B1* | 3/2019 | Filippova | G06N 3/0454 |
| 2008/0208372 | A1* | 8/2008 | Pannese | G05B 13/027 |
| | | | | 700/121 |
| 2014/0236578 | A1* | 8/2014 | Malon | G06F 40/30 |
| | | | | 704/9 |
| 2014/0330835 | A1* | 11/2014 | Boyer | G06F 16/2379 |
| | | | | 707/741 |
| 2014/0331120 | A1* | 11/2014 | Boyer | G06F 40/154 |
| | | | | 715/234 |
| 2018/0075348 | A1* | 3/2018 | Zhao | G06F 21/563 |
| 2018/0232443 | A1* | 8/2018 | Delgo | G06F 40/295 |
| 2018/0260827 | A1* | 9/2018 | Sullivan | G06N 3/0472 |
| 2019/0215286 | A1* | 7/2019 | Zhou | G06F 40/30 |
| 2019/0272296 | A1* | 9/2019 | Prakash | G06F 16/90335 |
| 2019/0340487 | A1* | 11/2019 | Aggarwal | G16H 70/60 |
| 2020/0258509 | A1* | 8/2020 | Bharadwaj | G10L 15/22 |

(Continued)

*Primary Examiner* — Kevin Ky (74) *Attorney, Agent, or Firm* — Morgan, Lewis & Bockius LLP (57) ABSTRACT

A natural language generating apparatus includes: a receiver configured to receive semantic expression information for generating a natural language sentence; and a controller configured to: generate a dependency tree representing a syntax structure of at least one word determined based on the received semantic expression information, based on a trained neural network model, and to generate the natural language sentence based on the generated dependency tree.

16 Claims, 6 Drawing Sheets

(56) References Cited

U.S. PATENT DOCUMENTS

| | | | |
|---|---|---|---|
| 2020/0285943 A1* | 9/2020 | Perera | G06N 3/0472 |
| 2021/0019309 A1* | 1/2021 | Yadav | G06F 16/248 |
| 2021/0090690 A1* | 3/2021 | Plum | G16C 20/70 |
| 2021/0319187 A1* | 10/2021 | Ito | G06Q 50/00 |

* cited by examiner

--PRIOR ART--

NATURAL LANGUAGE GENERATING APPARATUS, VEHICLE HAVING THE SAME AND NATURAL LANGUAGE GENERATING METHOD

CROSS-REFERENCE TO RELATED APPLICATION(S)

The present application claims the benefit of priority to Korean Patent Application No. 10-2019-0047133 filed on Apr. 23, 2019 in the Korean Intellectual Property Office, the entire disclosure of which is incorporated herein by reference.

TECHNICAL FIELD

The present disclosure relates to a natural language generating apparatus, a vehicle having the same and a natural language generating method.

BACKGROUND

A spoken dialogue system (SDS) may be a computer system designed to communicate with a user using natural language and plays an important role in a human-machine interaction.

A spoken dialogue system may generate natural language for talking with the user, and a rule-based acoustic model or a deep neural network-based acoustic model is used for a natural language generation operation.

Deep neural networks may include at least one of Recurrent Neural Network (RNN), Bi-directional RNN (BRNN), Long Short Term Memory (LSTM), Bi-directional LSTM (BLSTM), Gated Recurrent Unit (GRU), or Bi-directional GRU (BGRU).

The information included in this Background section is only for enhancement of understanding of the general background of the present disclosure and may not be taken as an acknowledgement or any form of suggestion that this information forms the prior art already known to a person skilled in the art.

SUMMARY

Various aspects of the present disclosure are directed to providing a vehicle capable of playing various contents through a display and a control method of such a vehicle.

Additional aspects of the disclosure will be set forth in part in the description which follows and, in part, will be obvious from the description, or may be learned by practice of the disclosure.

In accordance with one aspect of the present disclosure, a natural language generating apparatus may comprise: a receiver configured to receive semantic expression information for generating a natural language sentence; and a controller configured to: generate a dependency tree representing a syntax structure of at least one word determined based on the received semantic expression information, based on a trained neural network model, and generate the natural language sentence based on the generated dependency tree.

The controller may visit at least one node constituting a training dependency tree included in training data, based on a predetermined traversal algorithm, and may train the neural network model based on a node value of the visited node.

The controller may visit the at least one node constituting the training dependency tree based on a breadth-first search (BFS) algorithm.

When at least one of a node value of a first node visited or a node value of a parent node of the first node is input, the controller may train the neural network model such that a node value of a second node to be visited next to the first node is output.

The first node and the second node may be sibling nodes.

The controller may generate the dependency tree on which a root word determined based on the semantic expression information is a node value of a root node, based on the trained neural network model.

The controller may initiate generating the dependency tree including the root node having the root word by inputting the root word to the trained neural network model.

The controller may determine a child node of the root node visited based on a breadth-first search (BFS) algorithm and a node value corresponding to the child node, based on the trained neural network model, and may generate the dependency tree based on the determined child node and the node value corresponding to the child node.

The controller may determine an output value of the trained neural network model using a node value of a third node and a node value of a parent node of the third node, as a node value of a sibling node of the third node.

The controller may generate the natural language sentence based on node values of all nodes constituting the generated dependency tree.

The controller may visit all the nodes of the generated dependency tree based on a depth-first search (DFS) algorithm and may generate the natural language sentence by arranging words corresponding to the nodes of the generated dependency tree based on an order of visit.

The natural language generating apparatus may further comprise an output device, wherein the controller may control the output device to output the generated natural language sentence as a voice signal.

In accordance with another aspect of the present disclosure, a method of generating natural language may comprise: receiving semantic expression information for generating a natural language sentence; generating a dependency tree representing a syntax structure of at least one word determined based on the received semantic expression information, based on a trained neural network model; and generating the natural language sentence based on the generated dependency tree.

The method may further comprise: visiting at least one node constituting a training dependency tree included in training data, based on a predetermined traversal algorithm, and training the neural network model based on a node value of the visited node.

The training the neural network model based on a node value of the visited node may comprise: when at least one of a node value of a first node visited or a node value of a parent node of the first node is input, training the neural network model such that a node value of a second node to be visited next to the first node is output.

The generating a dependency tree based on a trained neural network model may comprise: generating the dependency tree on which a root word determined based on the semantic expression information is a node value of a root node, based on the trained neural network model.

The generating a dependency tree based on the trained neural network model may comprise: determining a child node of the root node visited based on a breadth-first search (BFS) algorithm and a node value corresponding to the child node, based on the trained neural network model; and generating the dependency tree based on the determined child node and the node value corresponding to the child node.

The generating the natural language sentence based on the generated dependency tree may comprise: generating the natural language sentence based on node values of all nodes constituting the generated dependency tree.

In accordance with another aspect of the present disclosure, a vehicle may comprise: a receiver configured to receive semantic expression information for generating a natural language sentence; and a controller configured to: generate a dependency tree representing a syntax structure of at least one word determined based on the received semantic expression information, based on a trained neural network model; and generate the natural language sentence based on the generated dependency tree.

In accordance with another aspect of the present disclosure, a non-transitory recording medium storing a computer program, which, when executed by a processor, performs a method, the method comprising: in combination with a computing device, receiving semantic expression information for generating a natural language sentence; generating a dependency tree representing a syntax structure of at least one word determined based on the received semantic expression information, based on a trained neural network model; and generating the natural language sentence based on the generated dependency tree.

DETAILED DESCRIPTION

Throughout this document, the same reference numerals and symbols will be used to designate the same or like components. In the following description of the present disclosure, detailed descriptions of known functions and configurations incorporated herein will be omitted when the subject matter of the present disclosure may be rendered rather unclear. The terms as used throughout the specification, such as part, "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood herein that, when a portion is referred to as being "connected to" another portion, not only can it be "directly connected to" the other portion, but it can also be "indirectly connected to" the other portion. When the portion is referred to as being indirectly connected to the other portion, the portion may be connected to the other portion via a wireless communications network.

It will be understood that the terms "comprise," "include," "have," and any variations thereof used herein are intended to cover non-exclusive inclusions unless explicitly described to the contrary.

Throughout the specification, when a member is located "on" another member, this includes not only when one member is in contact with another member but also when another member is present between the two members.

Although the terms "first," "second," "A," "B," etc. may be used to describe various components, the terms do not limit the corresponding components, but are used only for the purpose of distinguishing one component from another component.

Descriptions of components in the singular form used herein are intended to include descriptions of components in the plural form, unless explicitly described to the contrary.

The reference numerals or symbols in respective stages are only used to distinguish the respective stages from the other stages, and do not necessarily describe an order of the respective stages. The respective stages may be performed in an order different from the described order, unless a specific order is described in the context.

Hereinafter, exemplary embodiments of a vehicle and a control method thereof according to various aspects of the present disclosure will be described in detail with reference to the accompanying drawings.

Figure 1:
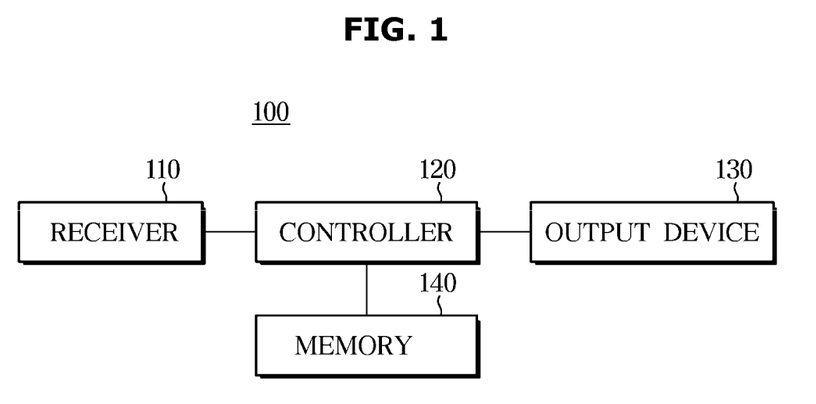
FIG. 1 is a control block diagram of a natural language generating apparatus according to an exemplary embodiment of the disclosure.
Figure 2:
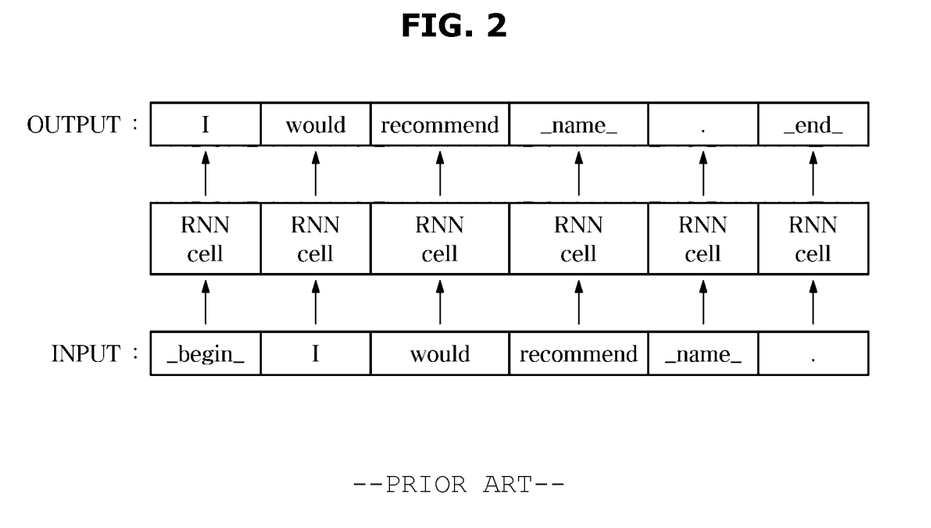
FIG. 2 is a view for explaining a method of generating natural language according to the prior art.
Figure 3A:
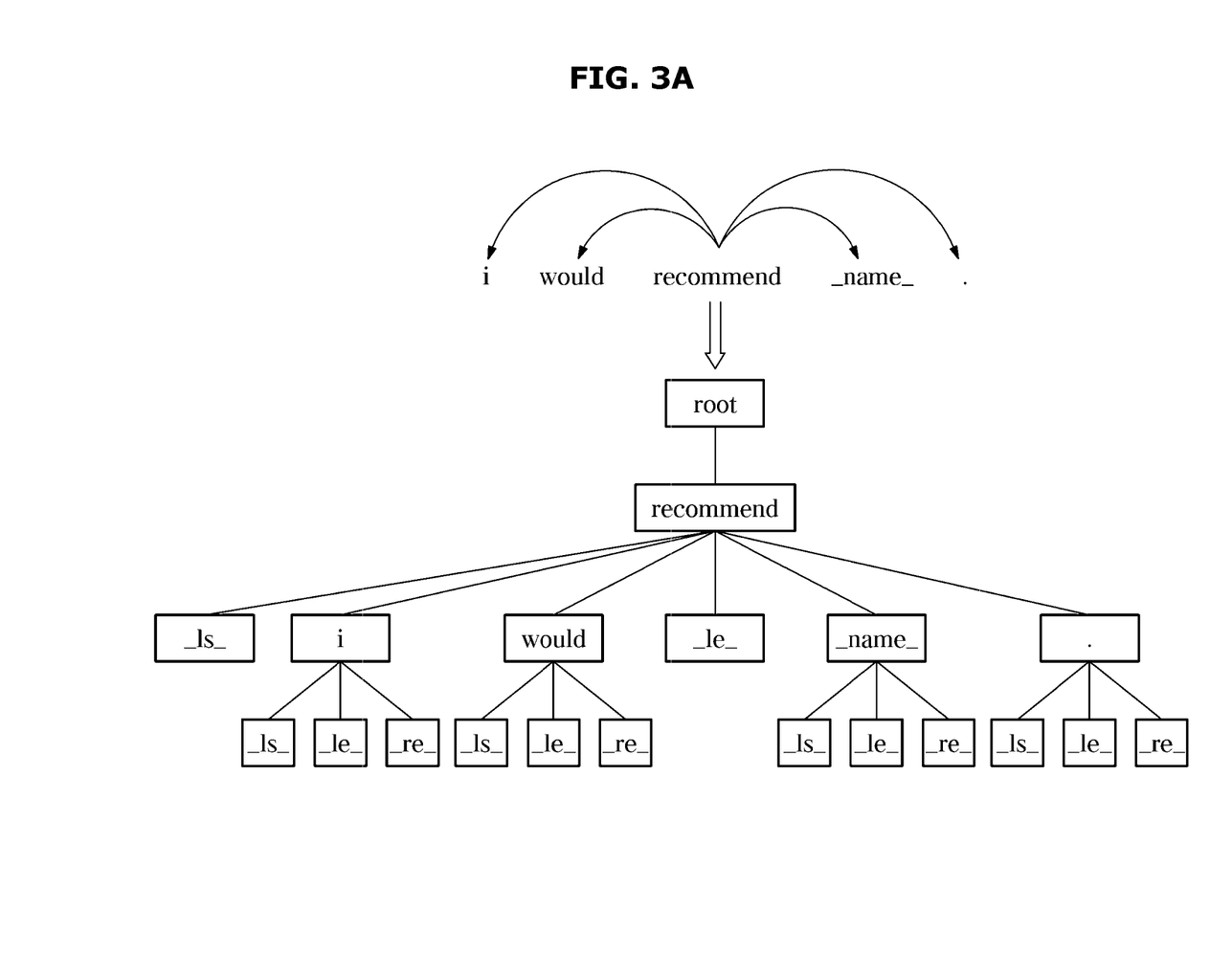
FIG. 3A is a diagram illustrating an example of a dependency tree used in a method of generating natural language according to an exemplary embodiment of the disclosure.
Figure 3B:
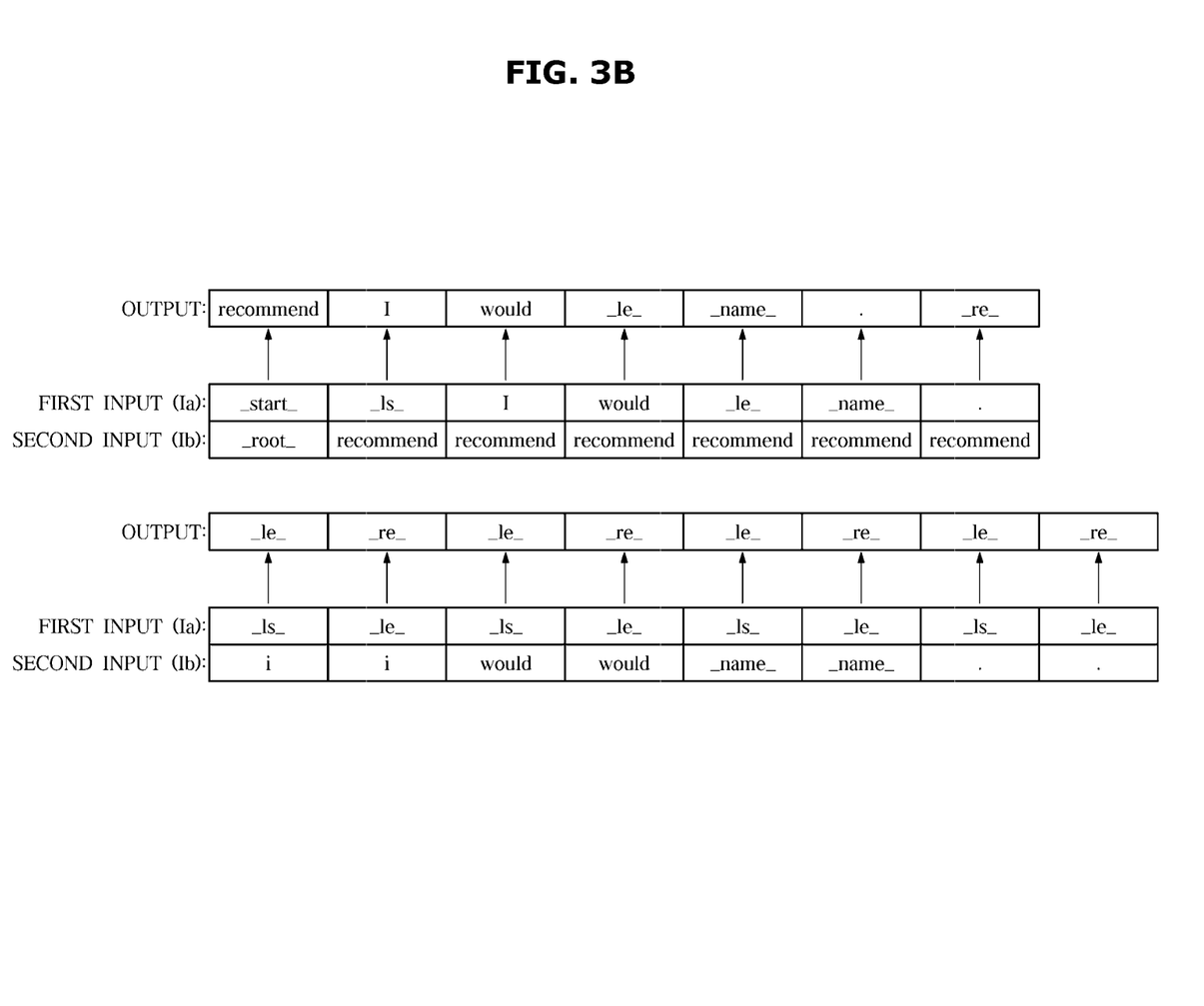
FIG. 3B is a diagram for describing a method of generating natural language according to an exemplary embodiment of the disclosure.

FIG. 1 is a control block diagram of a natural language generating apparatus according to an exemplary embodiment of the disclosure, FIG. 2 is a view for explaining a method of generating natural language according to the prior art, FIG. 3A is a diagram illustrating an example of a dependency tree used in a method of generating natural language according to an exemplary embodiment of the disclosure, and FIG. 3B is a diagram for describing a method of generating natural language according to an exemplary embodiment of the disclosure.

Referring to FIG. 1, a natural language generating apparatus 100 according to an exemplary embodiment may include a receiver 110 configured to receive semantic expression information for generating a natural language sentence, a controller 120 configured to generally control at least one configuration of the natural language generating apparatus 100, an output device 130, and a memory 140.

The receiver 110 may receive the semantic expression information for generating the natural language sentence. In this case, the semantic expression information may include information in a form that can be processed in a dialogue system. For example, the semantic expression information may include all information necessary for generating the natural language sentence, such as a speech act, an intention, a speech type, a data classification, and a corresponding data value.

Such semantic expression information may be obtained through natural language processing operations such as morphological analysis and dependency parsing based on text corresponding to a user's speech. In this case, the natural language processing operation may include overall operations of a spoken dialogue system such as automatic speech recognition and natural language understanding.

The semantic expression information may be obtained to include information such as the user's speech type, the data classification, and the corresponding data value necessary to grasp the speech act and the intention of the user spoken sentence converted into text.

In addition, the semantic expression information may be obtained to include information such as the speech type, the data classification, and the corresponding data value necessary for generating a response corresponding to the user's speech act or intention. In this case, the semantic expression information may refer to the information necessary for generating the natural language sentence to be output in response to the user's speech.

In addition, the semantic expression information may be expressed by a semantic expression tag. For example, the semantic expression information of a natural language sentence, "Guide me to Seoul Station," may be a dialogue act tag called "req," a data classification tag called "nevi," and a data value tag called "Seoul Station" corresponding to the data classification tag.

The receiver 110 may receive such semantic expression information from an external device such as a user terminal or a server. The receiver 110 may transmit the semantic expression information to the controller 120 to be used as a control basis of the controller 120.

To this end, the receiver 110 may include one or more components enabling communication with the external device, and may include, for example, at least one of a short range communication module, a wired communication module, or a wireless communication module.

The short-range communication module of the receiver 110 according to one exemplary embodiment of the present disclosure may include various short-range communication modules that transmit and receive signals using a wireless communication network in a short distance such as a Bluetooth module, an infrared communication module, an RFID (Radio Frequency Identification) communication module, a WLAN (Wireless Local Access Network) communication module, an NFC communication module, or a ZigBee communication module.

The wired communication module of the receiver 110 according to one exemplary embodiment of the present disclosure may include various wired communication modules such as a CAN (Controller Area Network) communication module, a LAN (Local Area Network) module, a WAN (Wide Area Network) module, or a VAN (Value Added Network) module, as well as various cable communication modules such as USB (Universal Serial Bus), HDMI (High Definition Multimedia Interface), DVI (Digital Visual Interface), RS-232 (recommended standard 232), power line communication, or POTS (plain old telephone service).

The wireless communication module, in addition to a Wi-Fi module and a wireless broadband module, may include wireless communication modules supporting various wireless communication methods such as GSM (Global System for Mobile Communication), CDMA (Code Division Multiple Access), WCDMA (Wideband Code Division Multiple Access), UMTS (Universal Mobile Telecommunications System), TDMA (Time Division Multiple Access), and LTE (Long Term Evolution).

The wireless communication module may include a wireless communication interface including an antenna and a transmitter for transmitting signals. The wireless communication module may further include a signal conversion module for modulating a digital control signal output from the controller 120 through the wireless communication interface according to the control of the controller 120 into an analog type wireless signal.

The wireless communication module may include the wireless communication interface including the antenna and a receiver for receiving signals. The wireless communication module may further include the signal conversion module for demodulating the analog type wireless signal received through the wireless communication interface into a digital control signal.

The controller 120 may generate the natural language sentence based on the semantic expression information received from the receiver 110. The controller 120 may use a neural network model in generating the natural language sentence including at least one word.

In this case, the neural network model used for natural language generation may be an acoustic model based on a deep neural network. Deep neural networks may include at least one of Recurrent Neural Network (RNN), Bi-directional RNN (BRNN), Long Short Term Memory (LSTM), Bi-directional LSTM (BLSTM), Gated Recurrent Unit (GRU), or Bi-directional GRU (BGRU).

For example, the controller 120 may generate a dependency tree from the semantic expression information through an RNN model, and may generate the natural language sentence based on the generated dependency tree.

The RNN model may be a deep learning algorithm, which is one of the technical fields of artificial representation learning, e.g., a technical field in which a machine extracts useful information from data.

However, the natural language generation using the existing RNN model may use an output value corresponding to a specific input value as the input value in the next time interval. In this case, the input value and the output value may include words constituting the sentence. By repeating this process, the natural language generation using the existing RNN model can generate the words constituting the sentences in a certain order.

As shown in FIG. 2, in order to generate a natural language sentence "I would recommend_name_" in the existing RNN model, a second element 'I', which is output in response to an input of a first element '_begin_', may be input to the RNN model again. When a third element 'would' is output in response to the input of the second element 'I', the third element 'would' is input again to the RNN model.

A fourth element 'recommend' is output, and a fifth element '_name_' is output in correspondence with the fourth element 'recommend'. Subsequently, a sixth element '.' is output in response to the input of the fifth element '_name_', and a seventh element '_end_' is output in response to the input of the sixth element '.'. That is, in the existing RNN model, since the word generated in the previous time interval is used as the input of the next time interval, the word of the sentence is simply generated in the forward or reverse direction.

However, considering that natural language may have various grammatical structures, the natural language generation according to the generation of words in a specific direction may not effectively convey various meanings of the natural language. Therefore, an operation of generating natural language by reflecting the various grammatical structures more effectively is required.

To more effectively reflect the various grammatical structures, the controller 120 may generate the dependency tree indicating a syntax structure of at least one word constituting the natural language.

The controller 120 may generate the dependency tree representing the syntax structure of at least one word determined based on the received semantic expression information, based on a trained neural network model. The controller 120 may generate the natural language sentences based on the generated dependency tree.

To this end, first, the controller 120 may train the neural network model to generate the dependency tree based on the received semantic expression information.

In detail, the controller 120 may visit at least one node constituting a training dependency tree included in training data based on a predetermined traversal algorithm, and may train the neural network model based on the node value of the visited node.

In this case, the training data may include the training dependency tree in which a node and a corresponding node value are predetermined, and may further include a training sentence corresponding to the training dependency tree.

The node value corresponding to the node may include at least one word included in the natural language sentence, and may further include a marker indicating a relative position and relationship of each node on the dependency tree. In addition, the marker may indicate the type of action performed on the node on the dependency tree in the process of generating the dependency tree (called 'coding') or the process of generating a sentence from the dependency tree (called 'decoding').

For example, the types of markers that the dependency tree may contain a "_start_" marker, which indicates that the traversal of the dependency tree begins, and a "_root_" marker, which means that it is located at the root node of the dependency tree. Also, a "_Is_" marker, which indicates the start of the traversal of a child node located on the left side on the dependency tree based on a parent node, is included in the types of markers. Additionally, there can be a "_le_" marker indicating the end of the traversal of the child node located on the left side based on the parent node and the start of the traversal of the child node located on the right side based on the parent node. Further, there may be a "_re_" (right end) marker which means that the traversal of the child node located on the right side based on the parent node is terminated and a "_ended_" marker which means that the traversal of the dependency tree is terminated.

However, such markers are only an example, and the markers included in the dependency tree may vary depending on the type of natural language. For example, since Korean does not have a word that modifies another word on the right side, the "_re_" marker may not exist in the dependency tree for generating Korean sentences.

Also, the predetermined traversal algorithm may be one of a breadth-first search (BFS) algorithm and a depth-first search (DFS) algorithm. However, the present disclosure is not limited to the above example, and various dependency tree traversal algorithms may be utilized.

The controller 120 may determine the input value of the neural network model and the output value corresponding thereto based on the node value of the visited node, and may train the neural network model based on the determined input value and output value.

In detail, the controller 120 may determine the node value of the visited node (called a first node) or the node value of the parent node of the first node as the input value, and may determine the node value of a second node to be visited next to the first node as the output value corresponding to the input value Alternatively, the controller 120 may determine the node value of the first node as a first input value, and determine the node value of the parent node of the first node as a second input value. In this case, the controller 120 may determine the output value when both the first input value and the second input value are input, as the node value of the second node to be visited next to the first node.

When the second node is visited after the first node, the controller 120 may determine the node value of the second node as the first input value, and may determine the node value of the parent node of the second node as the second input value. The controller 120 may determine the output value when both the first input value and the second input value are input, as the node value of the node to be visited next to the second node.

That is, when at least one of the node value of the visited node or the node value of the parent node of the visited node is input, the controller 120 may train the neural network model to output the node value of the node to be visited next to the visited node, while visiting all the nodes included in the training dependency tree based on the predetermined traversal algorithm. In this case, the neural network model may be the RNN model.

For example, referring to FIGS. 3A and 3B, the controller 120 may visit the node of the training dependency tree corresponding to a natural language sentence of "I would recommend_name_." based on the BFS algorithm.

In this case, as shown in FIG. 3A, the training dependency tree may be configured based on a root node whose root word "recommend" is a node value. The root word refers to a key word of a sentence to be generated based on the semantic expression information, and may be determined by the natural language processing operations such as a natural language understanding operation, a morpheme analysis operation, and a dependent syntax analysis operation.

As shown in FIG. 3B, when a first input la in which the marker "_start_" is the input value and a second input lb in which the marker "_root_" is the input value are input to the neural network model, the controller 120 may train the neural network model to output the root word "recommend" in response to the first input la and the second input lb.

After visiting the root node having the root word "recommend" as the root value (hereinafter, the node value corresponding to each node is shown in parentheses) based on the breadth-first traversal algorithm, the controller 120 may visit the child node whose parent node is the root node ("recommend").

The controller 120 may visit the child node of the root node ("recommend") from the left side, and visit the node whose node value is the "_Is_" marker, which means left traversal. In this case, the controller 120 may determine the node value of the node ("_Is_") currently visited as the first input value, and may determine the node value of the root node ("recommend") that is the parent node of the node ("_Is_") currently visited, as the second input value. When the first input value and the second input value are input, the controller 120 may train the neural network model to output the node value of the node "I" to be visited next as the output value.

In this case, the node to be visited next, that is, the node output by the neural network model, may be a sibling node relationship with the node currently visited.

Subsequently, while visiting the nodes constituting the dependency tree of FIG. 3A based on the breadth-first traversal algorithm, the controller 120 may train the neural network model to output the output value corresponding to the input of the first input value and the second input value illustrated in FIG. 3B. In this case, the controller 120 may train the neural network model to output the output value corresponding to the plurality of input values.

The controller 120 may store the trained neural network model in at least one of the memory 140 or an external server. The controller 120 may generate the natural language sentences using the trained neural network model.

The controller 120 may generate the dependency tree based on the semantic expression information using the trained neural network model, and may generate the natural language sentence based on the generated dependency tree.

The controller 120 may generate the dependency tree based on the trained neural network model based on the semantic expression information. The controller 120 may generate the natural language sentence based on the node values of all the nodes constituting the generated dependency tree.

The controller 120 may generate the dependency tree having the root node whose node value is the root word determined based on the semantic expression information, based on the trained neural network model. The controller 120 may generate the natural language sentence based on the generated dependency tree.

Specifically, the controller 120 may initiate generating the dependency tree in which the root word is the node value of the root node by inputting the root word into the trained neural network model. The controller 120 may visit the child node of the root node based on the predetermined traversal algorithm and determine the child node of the root node and the corresponding node value based on the neural network model. The controller 120 may generate the dependency tree based on the determined child node and the node value corresponding thereto.

That is, the controller 120 may determine the node value of the node to visit based on the predetermined traversal algorithm, based on the trained neural network model. The determination of the node value of the next node to be visited by the controller 120 may be performed by inputting the node value of the node currently visited and the node value of the parent node of the node currently visited into the neural network model. The controller 120 may determine the output value of the neural network model as the node value of the node to be visited next.

Subsequently, while continuing the traversal according to the predetermined traversal algorithm, the controller 120 may determine the node value of the node to be visited next, and continuously add a node having such node value to the dependency tree.

In other words, the controller 120 may input the node value of a specific node (called a third node) and the node value of the parent node of the third node into the trained neural network as the input value, and may determine the output value corresponding to the input value as the node value of the node to be visited next (called the fourth node). In this case, the fourth node may be the sibling node of the third node.

Subsequently, the controller 120 may input the node value of the fourth node and the node value of the parent node of the fourth node into the trained neural network as the input value, and may determine the output value corresponding to the input value as the node value of the node to be visited next. The controller 120 may generate the dependency tree by repeating the above process.

Further, the predetermined traversal algorithm for generating the dependency tree may be one of the breadth-first search (BFS) algorithm and the depth-first search (DFS) algorithm. However, the predetermined traversal algorithm is not limited to the above example, and various dependency tree traversal algorithms may be utilized.

In this case, the controller 120 may use the same traversal algorithm as the traversal algorithm used to train the neural network model, in the process of generating the dependency tree. For example, the controller 120 may use the node value of the node to be visited based on the breadth-first search (BFS) algorithm, as the output value of the neural network model to which the node value of the visited node and the node value of the parent node of the visited node is input.

By generating the dependency tree, the controller 120 may apply various syntax structures and semantic structures of natural language to generate the natural language sentence. Accordingly, since a more natural and various natural language sentence can be generated, a user's convenience of a dialogue system can be increased.

When the dependency tree is generated, the controller 120 may generate the natural language sentence based on the node values of all the nodes constituting the generated dependency tree.

In detail, the controller 120 may visit all the nodes of the generated dependency tree and generate the natural language sentence based on the node value corresponding to the visited node. The controller 120 may traverse all the nodes of the generated dependency tree, based on the predetermined traversal algorithm. The controller 120 may generate the natural language sentences by arranging the node values corresponding to the visited nodes, in the order of visit.

In this case, the controller 120 may generate the natural language sentence by arranging the words, which are the node values corresponding to the visited node, in the order of visit.

The predetermined traversal algorithm used in generating the natural language sentence from the dependency tree may be one of the breadth-first search (BFS) algorithm and the depth-first search (DFS) algorithm. However, the present disclosure is not limited to the above-described example, and various dependency tree traversal algorithms may be utilized.

The controller 120 may visit all the nodes of the generated dependency tree based on the depth-first traversal (DFS) algorithm, and may generate the natural language sentences by arranging the words corresponding to the nodes in the dependency tree in the order of visit.

As the controller 120 generates natural language from the dependency tree representing the syntax structure, the accuracy of the natural language sentence (Bilingual Evaluation Understudy Score, BLEU score) may be improved. In addition, it is possible to generate a more natural and various natural language sentence and a natural language sentence having various structures can be generated. Therefore, the user's convenience can be increased.

The controller 120 may control the output device 130 to output the generated natural language sentence as a voice signal.

In this case, the controller 120 may extract the user's speech acts or intentions from the user's speech signal, and may generate the natural language sentence based on the semantic expression information for generating a response corresponding to the user's speech act or intention through the above-described process. The controller 120 may determine the natural sentence as a response corresponding to the voice signal of the user, and may output the natural language sentence as the voice signal. Therefore, a natural response corresponding to the user's speech can be output.

Therefore, since a more accurate and natural response is possible, the user's convenience of using the dialogue system can be increased.

As described above, the natural language generating apparatus 100 according to an exemplary embodiment of the present disclosure may be included in the dialogue system to generate natural language for talking with the user. However, the present disclosure is not limited thereto, and the natural language generating apparatus 100 may be included in all systems using natural language such as a machine translation system as well as the dialogue system.

The controller 120 of the apparatus 100 according to an exemplary embodiment of the present disclosure may be a processor (e.g., computer, microprocessor, CPU, ASIC, circuitry, logic circuits, etc.). The controller 120 may be implemented by a non-transitory memory storing, e.g., a program(s), software instructions reproducing algorithms, etc., which, when executed, controls operations of various components of the apparatus 100, and a processor configured to execute the program(s), software instructions reproducing algorithms, etc. Herein, the memory and the processor may be implemented as separate semiconductor circuits (e.g. chips). Alternatively, the memory and the processor may be implemented as a single integrated semiconductor circuit. The processor may embody one or more processor(s).

The output device 130 may visually or audibly output the natural language sentence generated by the controller 120. To this end, the visual output device 130 may include a display or a speaker.

The memory 140 may store the neural network model trained by the controller 120 and related information.

In addition, the memory 140 may store information related to the natural language sentences generated by the controller 120. The memory 140 may store various information used in the process of generating the natural language sentence such as the dependency tree and nodes, node types, and node values included therein.

To this end, the memory 140 may be implemented as at least one of a non-volatile memory device such as a cache, ROM (Read Only Memory), PROM (Programmable ROM), EPROM (Erasable Programmable ROM), EEPROM (Electrically Erasable Programmable ROM), and a flash memory; a volatile memory device such as RAM (Random Access Memory); and a storage medium such as HDD (hard disk drive) and CD-ROM, but is not limited thereto. The memory 140 may be a memory implemented as a chip separate from the above-described processor in connection with the controller 120, and may be implemented as a single chip with the processor.

The memory 140 may be provided in the natural language generating apparatus 100 and may be provided in an external device such as a server. When provided in the external device such as the server, various information stored in the memory may be transmitted to the natural language generating apparatus 100 through the receiver 110.

The natural language generating apparatus 100 according to an exemplary embodiment may be included in a vehicle 200. The vehicle 200 may include the natural language generating apparatus 100 shown in FIG. 1 and may provide the dialogue system to the user in the vehicle 200.

At least one component may be added or deleted corresponding to the performance of the components of the natural language generating apparatus 100 illustrated in FIG. 1. It will be readily understood by those skilled in the art that the relative positions of the components may be changed corresponding to the performance or structure of the system.

Each of the components illustrated in FIG. 1 refers to a software component and/or a hardware component such as a Field Programmable Gate Array (FPGA) and an Application Specific Integrated Circuit (ASIC).

Figure 4:
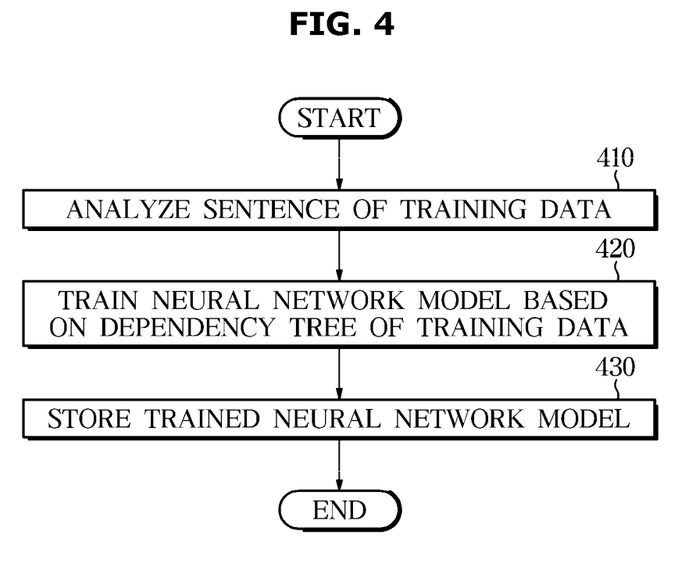
FIG. 4 is a flowchart illustrating a method of generating natural language according to an exemplary embodiment of the disclosure.

FIG. 4 is a flowchart illustrating a method of generating natural language according to an exemplary embodiment of the disclosure.

Referring to FIG. 4, the natural language generating apparatus 100 according to an exemplary embodiment may analyze a sentence of training data (410). At this time, the natural language generating apparatus 100 may determine the speech act and the intention of the sentence through the natural language processing operations such as the morphological analysis and the dependency parsing on the sentences included in the training data. In this case, the natural language processing operation may include overall operations of the spoken dialogue system such as the automatic speech recognition and the natural language understanding.

The natural language generating apparatus 100 may obtain the semantic expression information based on the analysis result of the sentence of the training data. In this case, the semantic expression information may include information in a form that can be processed in the dialogue system. For example, the semantic expression information may include all information necessary for generating the natural language sentence, such as the speech act, the intention, the speech type, the data classification, and the corresponding data value. Such semantic expression information may be determined by the natural language generating apparatus 100 itself or may be received from an external device.

Thereafter, the natural language generating apparatus 100 may train the neural network model based on the dependency tree of the training data (420). In detail, the natural language generating apparatus 100 may train the neural network model to generate the dependency tree representing the syntax structure of at least one word determined based on the received semantic expression information.

The natural language generating apparatus 100 may visit at least one node constituting the training dependency tree included in the training data, based on the predetermined traversal algorithm, and may train the neural network model based on the node value of the visited node.

In this case, the predetermined traversal algorithm may be one of the breadth-first search (BFS) algorithm and the depth-first search (DFS) algorithm. However, the present disclosure is not limited to the above example, and various dependency tree traversal algorithms may be utilized.

The natural language generating apparatus 100 may determine the input value of the neural network model and the output value corresponding thereto based on the node value of the visited node, and may train the neural network model based on the determined input value and the output value.

In detail, the natural language generating apparatus 100 may determine the node value of the visited node (called the first node) or the node value of the parent node of the first node as the input value, and may determine the node value of the second node to be visited next to the first node as the output value corresponding to the input value Alternatively, the natural language generating apparatus 100 may determine the node value of the first node as the first input value, and determine the node value of the parent node of the first node as the second input value. In this case, the natural language generating apparatus 100 may determine the output value when both the first input value and the second input value are input, as the node value of the second node to be visited next to the first node.

When the second node is visited after the first node, the natural language generating apparatus 100 may determine the node value of the second node as the first input value, and determine the node value of the parent node of the second node as the second input value. The natural language generating apparatus 100 may determine the output value when both the first input value and the second input value are input, as the node value of the node to be visited next to the second node.

That is, when at least one of the node value of the visited node or the node value of the parent node of the visited node is input, the natural language generating apparatus 100 may train the neural network model to output the node value of the node to be visited next to the visited node, while visiting all the nodes included in the training dependency tree based on the predetermined traversal algorithm. In this case, the neural network model may be an RNN model.

Thereafter, the natural language generating apparatus 100 may store the trained neural network model (430). In this case, the natural language generating apparatus 100 may store the trained neural network model in at least one of a memory or an external server. The natural language generating apparatus 100 may generate the natural language sentence using the trained neural network model.

Through this, the natural language generating apparatus 100 may train an operation of generating the dependency tree representing the syntax structure between words constituting the natural language sentence through the neural network model. Accordingly, natural language including various syntax structures and semantic structures can be generated. As a result, since a more natural and various natural language sentence is generated, the user's convenience of the dialogue system can be increased.

Figure 5:
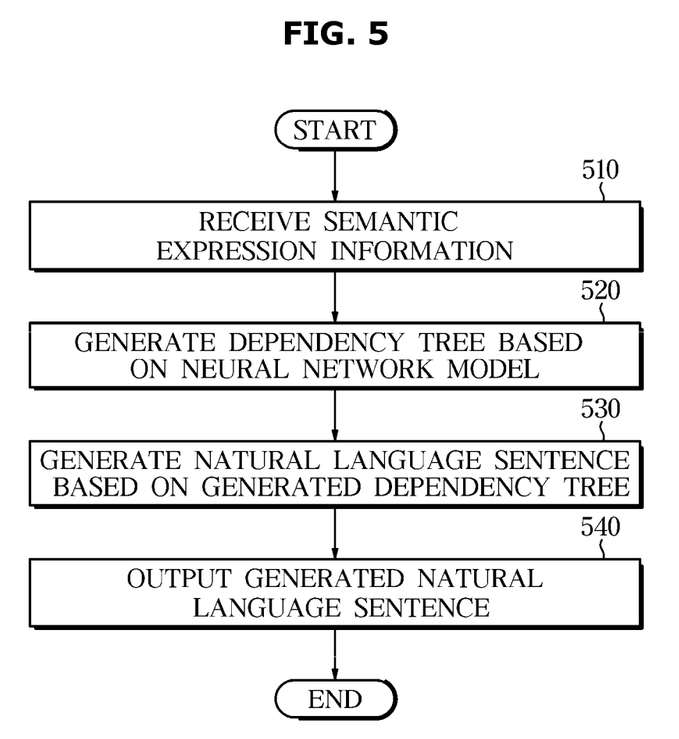
FIG. 5 is a flowchart illustrating a method of generating natural language according to an exemplary embodiment of the disclosure.

FIG. 5 is a flowchart illustrating a method of generating natural language according to an exemplary embodiment of the disclosure.

Referring to FIG. 5, the natural language generating apparatus 100 according to an exemplary embodiment may receive the semantic expression information (510) and may generate the dependency tree representing the syntax structure of at least one word determined based on the received semantic expression information, based on the trained neural network model (520).

The natural language generating apparatus 100 may generate the dependency tree having the root node whose node value is the root word determined based on the semantic expression information, based on the trained neural network model. Specifically, the natural language generating apparatus 100 may initiate generating the dependency tree in which the root word is the node value of the root node by inputting the root word into the trained neural network model. The natural language generating apparatus 100 may visit the child node of the root node based on the predetermined traversal algorithm and determine the child node of the root node and the corresponding node value based on the neural network model. The natural language generating apparatus 100 may generate the dependency tree based on the determined child node and the node value corresponding thereto.

That is, the natural language generating apparatus 100 may determine the node value of the node to visit based on the predetermined traversal algorithm, based on the trained neural network model. The determination of the node value of the next node to be visited by the natural language generating apparatus 100 may be performed by inputting the node value of the node currently visited and the node value of the parent node of the node currently visited into the neural network model. The natural language generating apparatus 100 may determine the output value of the neural network model as the node value of the node to be visited next.

Subsequently, while continuing the traversal according to the predetermined traversal algorithm, the natural language generating apparatus 100 may determine the node value of the node to be visited next, and continuously add a node having such node value to the dependency tree.

In other words, the natural language generating apparatus 100 may input the node value of a specific node (called the third node) and the node value of the parent node of the third node into the trained neural network as the input value, and may determine the output value corresponding to the input value as the node value of the node to be visited next (called the fourth node). In this case, the fourth node may be the sibling node of the third node.

Subsequently, the natural language generating apparatus 100 may input the node value of the fourth node and the node value of the parent node of the fourth node into the trained neural network as the input value, and may determine the output value corresponding to the input value as the node value of the node to be visited next. The natural language generating apparatus 100 may generate the dependency tree by repeating the above process.

Meanwhile, the predetermined traversal algorithm for generating the dependency tree may be one of the breadth-first search (BFS) algorithm and the depth-first search (DFS) algorithm. However, the predetermined traversal algorithm is not limited to the above example, and various dependency tree traversal algorithms may be utilized.

In this case, the natural language generating apparatus 100 may use the same traversal algorithm as the traversal algorithm used to train the neural network model, in the process of generating the dependency tree. For example, the natural language generating apparatus 100 may use the node value of the node to be visited based on the breadth-first search (BFS) algorithm, as the output value of the neural network model to which the node value of the visited node and the node value of the parent node of the visited node is input.

When the dependency tree is generated, the natural language generating apparatus 100 may generate the natural language sentence based on the generated dependency tree (530).

In detail, the natural language generating apparatus 100 may visit all the nodes of the generated dependency tree and generate the natural language sentence based on the node value corresponding to the visited node. The natural language generating apparatus 100 may traverse all the nodes of the generated dependency tree, based on the predetermined traversal algorithm. The natural language generating apparatus 100 may generate the natural language sentences by arranging the node values corresponding to the visited nodes, in the order of visit.

In this case, the natural language generating apparatus 100 may generate the natural language sentence by arranging the words, which are the node values corresponding to the visited node, in the order of visit.

The predetermined traversal algorithm used in generating the natural language sentence from the dependency tree may be one of the breadth-first search (BFS) algorithm and the depth-first search (DFS) algorithm. However, the present disclosure is not limited to the above-described example, and various dependency tree traversal algorithms may be utilized.

The natural language generating apparatus 100 may visit all the nodes of the generated dependency tree based on the depth-first traversal (DFS) algorithm, and may generate the natural language sentences by arranging the words corresponding to the nodes in the dependency tree in the order of visit.

Thereafter, the natural language generating apparatus 100 may output the generated natural language sentence (540). At this time, the natural language generating apparatus 100 may output the generated natural language sentence as a voice signal, and may output the voice signal to the natural language sentence generated as a response corresponding to the voice signal of the user.

As the natural language generating apparatus 100 generates natural language from the dependency tree representing the syntax structure, the accuracy of the natural language sentence (Bilingual Evaluation Understudy Score, BLEU score) may be improved. In addition, it is possible to generate a more natural and various natural language sentence and a natural language sentence having various structures can be generated. Accordingly, the user's convenience can be increased.

The disclosed embodiments may be implemented in the form of a recording medium storing instructions executable by a computer. The instructions may be stored in the form of a program code, and when executed by a processor, a program module may be created to perform the operations of the disclosed embodiments. The recording medium may be implemented as a computer-readable recording medium.

The computer-readable recording medium includes all kinds of recording media in which instructions which may be decrypted by a computer are stored. For example, there may be ROM (Read Only Memory), RAM (Random Access Memory), a magnetic tape, a magnetic disk, a flash memory, an optical data storage device, and the like.

As is apparent from the above, according to a natural language generating apparatus, a vehicle having the same and a natural language generating method according to an aspect of the present disclosure, more natural and various natural language sentences can be generated, and natural language sentences having various structures can be generated. Therefore, the user's convenience can be increased.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting,

What is claimed is:

1. A natural language generating apparatus comprising:
    a receiver configured to receive semantic expression information including a speech act or intention of a natural language sentence to generate the natural language sentence; and
    a controller configured to:
    extract speech acts or intentions from a speech signal of a user,
    generate a dependency tree representing a syntax structure of at least one word determined based on the semantic expression information received for a response corresponding to the speech acts or intentions, based on a neural network model,
    generate the natural language sentence based on the generated dependency tree,
    visit a first node among nodes of the dependency tree based on a predetermined traversal algorithm,
    determine a first node value of the first node and a parent node value of a parent node of the first node as input values of the neural network model in response to visiting of the first node,
    based on the determined input values, train the neural network model to output a second node value of a second node to be visited following the first node, and
    determine an output value of the trained neural network model using the first node value of the first node and the parent node value of the parent node of the first node, as the second node value of the second node,
    wherein, when both of the first node value of the first node and the parent node value of the parent node of the first node are input as first and second input values, respectively, the controller determines the output value as the second node value of the second node to be visited following the first node.

2. The natural language generating apparatus of claim 1, wherein the controller is configured to visit each of the nodes based on a breadth-first search (BFS) algorithm.

3. The natural language generating apparatus of claim 1, wherein the first node and the second node are sibling nodes.

4. The natural language generating apparatus of claim 1, wherein the controller is configured to generate the dependency tree on which a root word determined based on the semantic expression information is a node value of a root node, based on the trained neural network model.

5. The natural language generating apparatus of claim 4, wherein the controller is configured to initiate generating the dependency tree which includes the node value of the root node having the root word by inputting the root word to the trained neural network model.

6. The natural language generating apparatus of claim 4, wherein the controller is configured to determine a child node of the root node visited based on a breadth-first search (BFS) algorithm and a node value corresponding to the child node, based on the trained neural network model, and to generate the dependency tree based on the determined child node and the node value corresponding to the child node.

7. The natural language generating apparatus of claim 6, wherein the controller is configured to determine an output value of the trained neural network model using a node value of a third node and a node value of a parent node of the third node, as a node value of a sibling node of the third node.

8. The natural language generating apparatus of claim 1, wherein the controller is configured to generate the natural language sentence based on node values of the nodes.

9. The natural language generating apparatus of claim 8, wherein the controller is configured to visit the nodes based on a depth-first search (DFS) algorithm and to generate the natural language sentence by arranging words corresponding to the nodes based on an order of visit.

10. The natural language generating apparatus of claim 8, further comprising an output device, wherein the controller is configured to control the output device to output the generated natural language sentence as a voice signal.

11. A method of generating natural language, comprising:
    receiving semantic expression information including a speech act or intention of a natural language sentence to generate the natural language sentence;
    extracting speech acts or intentions from a speech signal of a user;
    generating a dependency tree representing a syntax structure of at least one word determined based on the semantic expression information received for a response corresponding to the speech acts or intentions, based on a neural network model;
    generating the natural language sentence based on the generated dependency tree;
    visiting a first node among nodes of the dependency tree based on a predetermined traversal algorithm;

determining a first node value of the first node and a parent node value of a parent node of the first node as input values of the neural network model in response to visiting of the first node;

based on the determined input values, training the neural network model to output a second node value of a second node to be visited following the first node, and determining an output value of the trained neural network model using the first node value of the first node and the parent node value of the parent node of the first node, as the second node value of the second node, wherein the determining the output value of the trained neural network model comprises when both of the first node value of the first node and the parent node value of the parent node of the first node are input as first and second input values, respectively, determining the output value as the second node value of the second node to be visited following the first node.

12. The method of claim 11, wherein the generating the dependency tree based on the neural network model comprises generating the dependency tree on which a root word determined based on the semantic expression information is a node value of a root node, based on the trained neural network model.

13. The method of claim 12, wherein the generating the dependency tree based on the neural network model further comprises:

determining a child node of the root node visited based on a breadth-first search (BFS) algorithm and a node value corresponding to the child node, based on the trained neural network model; and generating the dependency tree based on the determined child node and the node value corresponding to the child node.

14. The method of claim 11, wherein the generating the natural language sentence based on the generated dependency tree comprises generating the natural language sentence based on node values of all nodes constituting the generated dependency tree.

15. A vehicle comprising:

a receiver configured to receive semantic expression information including a speech act or intention of a natural language sentence to generate the natural language sentence; and a controller configured to:

extract speech acts or intentions from a speech signal of a user, generate a dependency tree representing a syntax structure of at least one word determined based on the semantic expression information received for a response corresponding to the speech acts or intentions, based on a neural network model, generate the natural language sentence based on the generated dependency tree, visit a first node among nodes of the dependency tree based on a predetermined traversal algorithm, determine a first node value of the first node and a parent node value of a parent node of the first node as input values of the neural network model in response to visiting of the first node, based on the determined input values, train the neural network model to output a second node value of a second node to be visited following the first node, and determine an output value of the trained neural network model using the first node value of the first node and the parent node value of the parent node of the first node, as the second node value of the second node, wherein, when both of the first node value of the first node and the parent node value of the parent node of the first node are input as first and second input values, respectively, the controller determines the output value as the second node value of the second node to be visited following the first node.

16. A non-transitory recording medium storing a computer program, which, when executed by a processor, performs a method, the method comprising:

in combination with a computing device, receiving semantic expression information including a speech act or intention of a natural language sentence to generate the natural language sentence;

extracting speech acts or intentions from a speech signal of a user;

generating a dependency tree representing a syntax structure of at least one word determined based on the received semantic expression information received for a response corresponding to the speech acts or intentions, based on a neural network model;

generating the natural language sentence based on the generated dependency tree;

visiting a first node among nodes of the dependency tree based on a predetermined traversal algorithm;

determining a first node value of the first node and a parent node value of a parent node of the first node as input values of the neural network model in response to visiting of the first node;

based on the determined input values, training the neural network model to output a second node value of a second node to be visited following the first node, and determining an output value of the trained neural network model using the first node value of the first node and the parent node value of the parent node of the first node, as the second node value of the second node, wherein the determining the output value of the trained neural network model comprises when both of the first node value of the first node and the parent node value of the parent node of the first node are input as first and second input values, respectively, determining the output value as the second node value of the second node to be visited following the first node.

* * * * *